(12) United States Patent  
Dunfee et al.

(10) Patent No.: US 7,240,477 B1  
(45) Date of Patent: Jul. 10, 2007

(54) FLEXIBLE ROUTER FOR LIQUID TUBES AND ELECTRICAL RIBBON CABLES

(75) Inventors: William D. Dunfee, Newark, DE (US); David G. Henderson, Hockessin, DE (US); Thomas E. Weitkamp, Newark, DE (US)

(73) Assignee: Dade Behring Inc., Deerfield, IL (US)

( * ) Notice: Subject to any disclaimer, the term of this patent is extended or adjusted under 35 U.S.C. 154(b) by 0 days.

(21) Appl. No.: 11/384,986

(22) Filed: Mar. 20, 2006

(51) Int. Cl.
*F16G 13/16* (2006.01)
*F16L 3/14* (2006.01)

(52) U.S. Cl. ............................ 59/78.1; 248/49; 248/51

(58) Field of Classification Search ................ 59/78.1; 248/49, 51
See application file for complete search history.

(56) References Cited

U.S. PATENT DOCUMENTS

| | | | |
|---|---|---|---|
| 4,840,023 A * | 6/1989 | Borsani ...................... 59/78.1 |
| 4,852,342 A | 8/1989 | Hart ........................... 59/78.1 |
| 4,988,838 A * | 1/1991 | Kirtland ....................... 248/51 |
| 5,824,957 A * | 10/1998 | Holshausen ................. 59/78.1 |
| 5,829,243 A * | 11/1998 | Hughes ....................... 59/78.1 |
| 5,900,586 A * | 5/1999 | Carr ............................ 248/49 |
| 5,980,409 A | 11/1999 | Blase .......................... 474/218 |
| 6,170,249 B1 | 1/2001 | Blase et al. .................. 59/78.1 |
| 6,190,277 B1 | 2/2001 | Blase .......................... 474/218 |
| 6,321,524 B1 * | 11/2001 | Bro ............................. 59/78.1 |
| 6,425,238 B1 | 7/2002 | Blase .......................... 59/78.1 |
| 6,550,233 B2 | 4/2003 | Blase .......................... 59/78.1 |
| 6,612,104 B2 | 9/2003 | Blase .......................... 59/78.1 |
| 6,695,014 B2 | 2/2004 | Blase .......................... 138/120 |
| 6,745,555 B2 | 6/2004 | Hermey et al. .............. 59/78.1 |

* cited by examiner

Primary Examiner—David B Jones
(74) Attorney, Agent, or Firm—Leland K. Jordan

(57) ABSTRACT

An improved energy tube-cable-router for securing flat cables and fluid carrying tubes and adapted to eliminate an undesirable pumping action of the fluid within the tubes by maintaining the longitudinal axis of tubes in a plane containing the central radius of curvature of tube-cable-router.

5 Claims, 11 Drawing Sheets

FLEXIBLE ROUTER FOR LIQUID TUBES AND ELECTRICAL RIBBON CABLES

FIELD OF THE INVENTION

This present invention relates to a flexible router for simultaneously securing a number of liquid carrying tubes and electrical ribbon cables.

BACKGROUND OF THE INVENTION

Various types of analytical tests related to patient diagnosis and therapy can be performed by analysis of a liquid sample taken from a patient's infections, bodily fluids or abscesses. These assays are typically conducted with automated clinical analyzers onto which liquid patient samples have been loaded. The analyzer extracts liquid sample from a container and combines the sample with various reagents in special reaction cuvettes. Usually the sample-reagent solution is incubated or otherwise processed before being analyzed. Analytical measurements are performed using a beam of interrogating radiation interacting with the sample-reagent combination to generate absorption readings or the like. The readings allow determination of end-point or rate values from which an amount of analyte related to the health of the patient may be determined using well-known calibration techniques.

Within such analyzers, a large number of liquid sample and reagent aspiration/dispensing probes are usually employed in order to extract incoming sample from a container, dispense aliquot portions of said sample into an aliquot array, to aspirate aliquot samples from the array and dispense aliquot samples into a reaction cuvette, and/or to extract reaction reagents from a container and directly dispense aspirated reagents into a reaction cuvette. In addition, within such analyzers, a very large number of electrical cables are interconnected between the various electromechanical controlling and controlled devices. For space-saving reasons, a popular electrical cable is shaped like a flat ribbon and is formed of a number of electrical conductors covered by an insulator and placed side-by-side. Ribbon electrical cables are frequently utilized to direct electrical signals between stationary printed circuit boards and electromechanical devices that are translated horizontally and vertically for millions of cycles. In a typical static application a latch may be sufficient to retain the cable securely. However, in applications in which substantial and/or sustained movement is encountered like described, latches are usually found to be inadequate over periods of sustained use. Thus, a need exists for a retaining device which secures the cable firmly irrespective of substantial sustained movement.

In order to minimize impact upon patients as well as to decrease the costs of clinical assays, the volumes of liquid sample aliquots and reagents are increasingly made smaller, in the range of about 1 microliter to five microliters; therefore, the pumping systems associated with sample and reagent aspiration and dispensing probes must be capable of handling precise precisely known and controlled liquid volumes. Almost all sample and reagent aspiration/dispensing probes are mounted on translatable arms having both horizontal and vertical motion in order to translate probes between locations as well as to raise and lower probes into and out of containers. Consequently, a popular practice is to attach a probe to a pumping system using flexible tubing within a guide chain; furthermore, to reduce pumping volume uncertainties, the tubing is filled with an inert liquid, as opposed to air, between the pumping system and the probe. The tube is also generally secured on and between stationary and/or moving parts using a guide with circular dimensions. To run such tubes, in particular from a stationary junction point to a movable device like a dispensing probe, it is common to use so-called line guide elements which are interconnected to form an energy conducting guide chain, like those available from Igus GMBH (Koln, Germany).

For example, U.S. Pat. No. 6,745,555 discloses an energy guiding chain, in which the articulated joints include joint elements that are elastically deformable in the bending direction of the chain links and designed as separate components, where the joint elements extend partially between the inside and outside lateral surfaces of the straps.

U.S. Pat. No. 6,550,233 discloses an energy guiding chain having a plurality of plastic chain links that are connected to one another, each of which includes two side straps and two cross-members, where the cross-members are connected to the side straps in detachable fashion. A snap mechanism is provided which interacts with a snap ridge provided on each end of the cross-members.

U.S. Pat. No. 6,170,249 discloses an energy guiding chain for accommodating cables and hoses. The chain has laterally spaced parallel side-plates with upper and lower cross-members. A cross-sectional space for cables and hoses is defined by the side-plates and the upper and lower edges of the side-plates. The cross-sectional space is expanded since at least one of the cross-members is detachably mounted on the side-plates.

U.S. Pat. No. 5,980,409 discloses an energy transmission chain with high lateral stability, particularly when installed in a lateral position.

While these energy guiding chains are quite useful in handling cables and hoses, it t has been discovered, however, that the tubing must be precisely placed and maintained along the central radius of curvature of such a guide in order to prevent a "peristaltic-type" pumping action of the fluid within the tube as the curved section of tubing moves. If the tubing falls to the inside of the guide, the tubing is slightly compressed; likewise, if the tubing falls to the outside of the guide, the tubing is slightly stretched. Both actions cause a change of volume of fluid inside the curved portion and a pumping action is created as the probe is translated between aspirate and dispense locations and the tubing is moved in opposite directions along a circular guide. This false pumping is in addition to the controlled pumping, thereby adversely affecting the accuracy of the aspirated or dispensed sample/reagent liquid.

SUMMARY OF THE INVENTION

The present invention meets the combined needs for securing flat cables and fluid carrying tubes and adapted to eliminate an undesirable pumping action of the fluid within the tubes by providing a number of multiple tube-cable links adapted to simultaneously secure a flat ribbon electrical cable and a number of fluid tubes, the fluid tubes being constrained to be translated in a linear plane, the tube-cable links flexibly joined to one another forming a flexible energy tube-cable-router, in combination with a pair of mounting brackets at both ends of a said tube-cable-router, one mounting bracket suitable for mounting proximate a stable electrical power and control source, the other mounting bracket located proximate a moveable liquid aspiration/dispensing probe.

BRIEF DESCRIPTION OF THE DRAWINGS

The invention will be more fully understood from the following detailed description thereof taken in connection with the accompanying drawings which form a part of this application and in which.

DETAILED DESCRIPTION OF THE INVENTION

Figure 1:
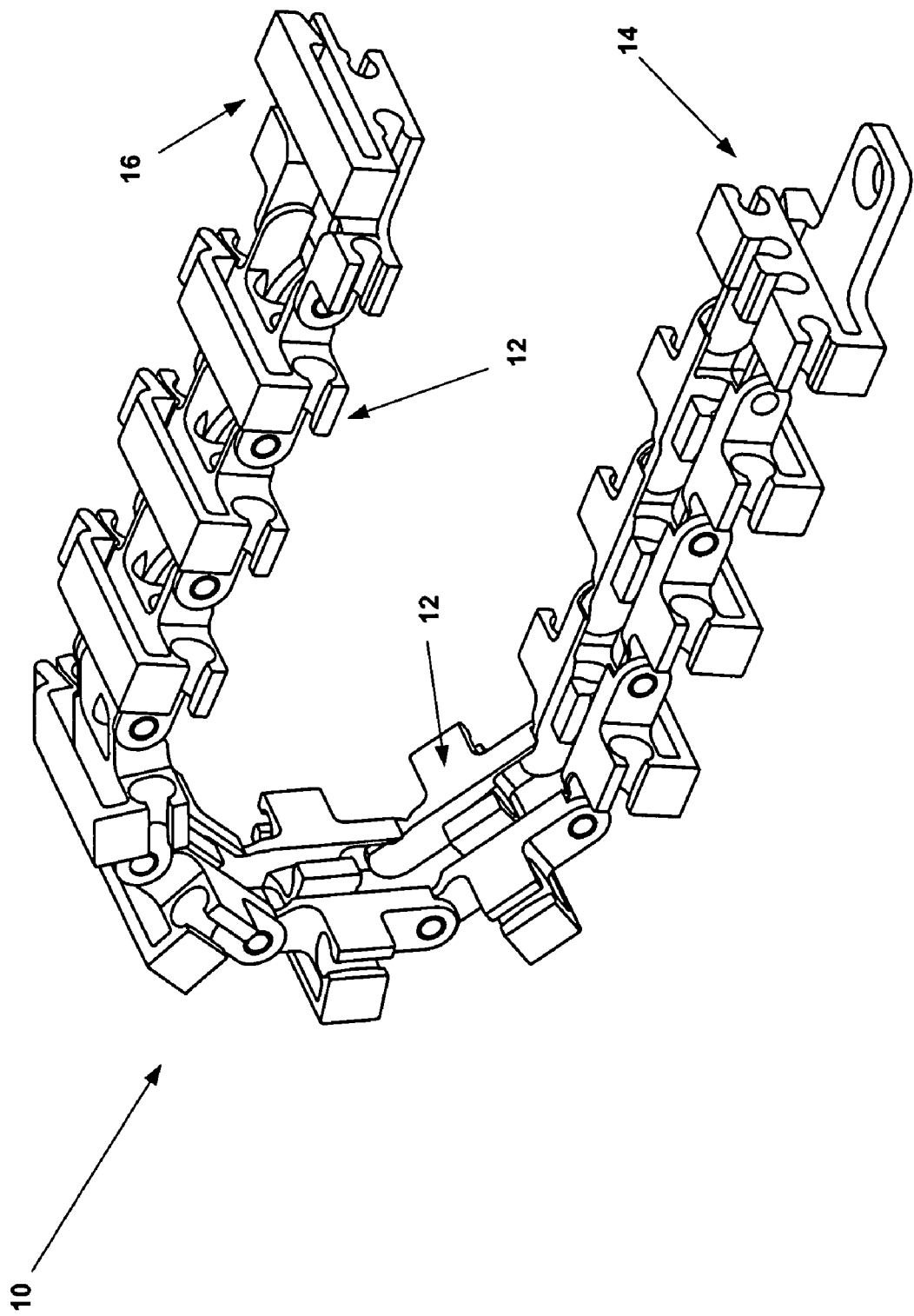
FIG. 1 is a perspective view of a flexible tube-cable-router exemplary of the present invention.

FIG. 1 is a perspective assembly view of the flexible tube-cable-router 10 of the present invention constructed by assembling together an articulated number of individual dual-end link members 12 to form a two-ended chain of link members 12. A first end mounting bracket terminator 14 is attached to one end of the chain of link members 12 and a second end mounting bracket terminator 16 is attached to the remaining end of the chain of link members 12.

Figure 2:
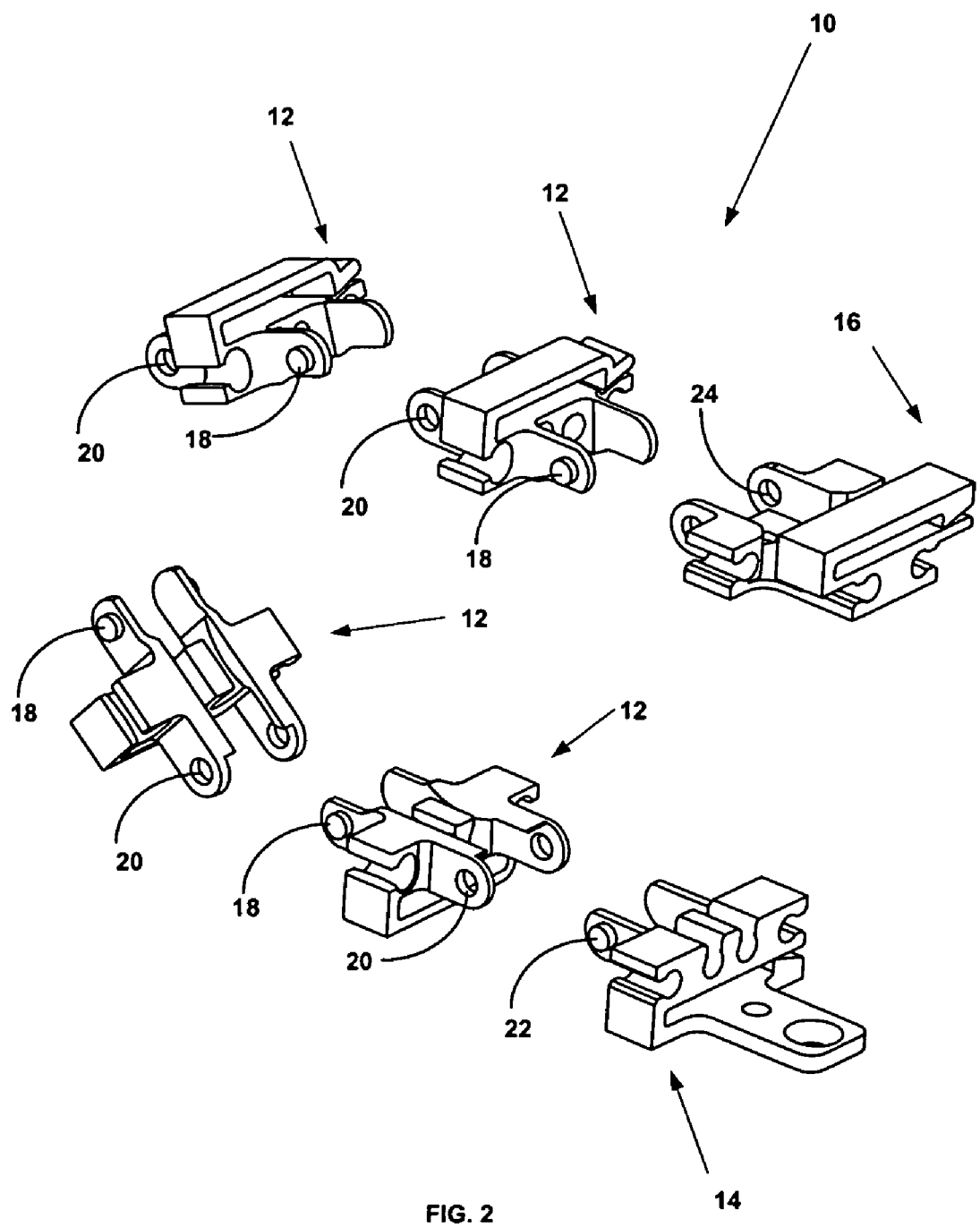
FIG. 2 is an exploded view of the tube-cable-router of FIG. 1.

FIG. 2 is a exploded perspective view of the flexible tube-cable-router 10 of FIG. 1 and illustrates how the two-ended chain of link members 12 is assembled by successively placing link hinge pins 18 into link hinge openings 20 and also placing terminator hinge pins 22 of first end mounting bracket terminator 14 into link hinge openings 20 as well as placing link hinge pins 18 into terminator hinge openings 24 of second end mounting bracket terminator 16. Tube-cable-router 10 is provided with a number of unique features described hereinafter in order to facilitate assembly and secure clamping of a number of fluid tubes 78 (seen in FIG. 6) and a flat ribbon electrical cable 80 (seen in FIG. 6).

Figure 3:
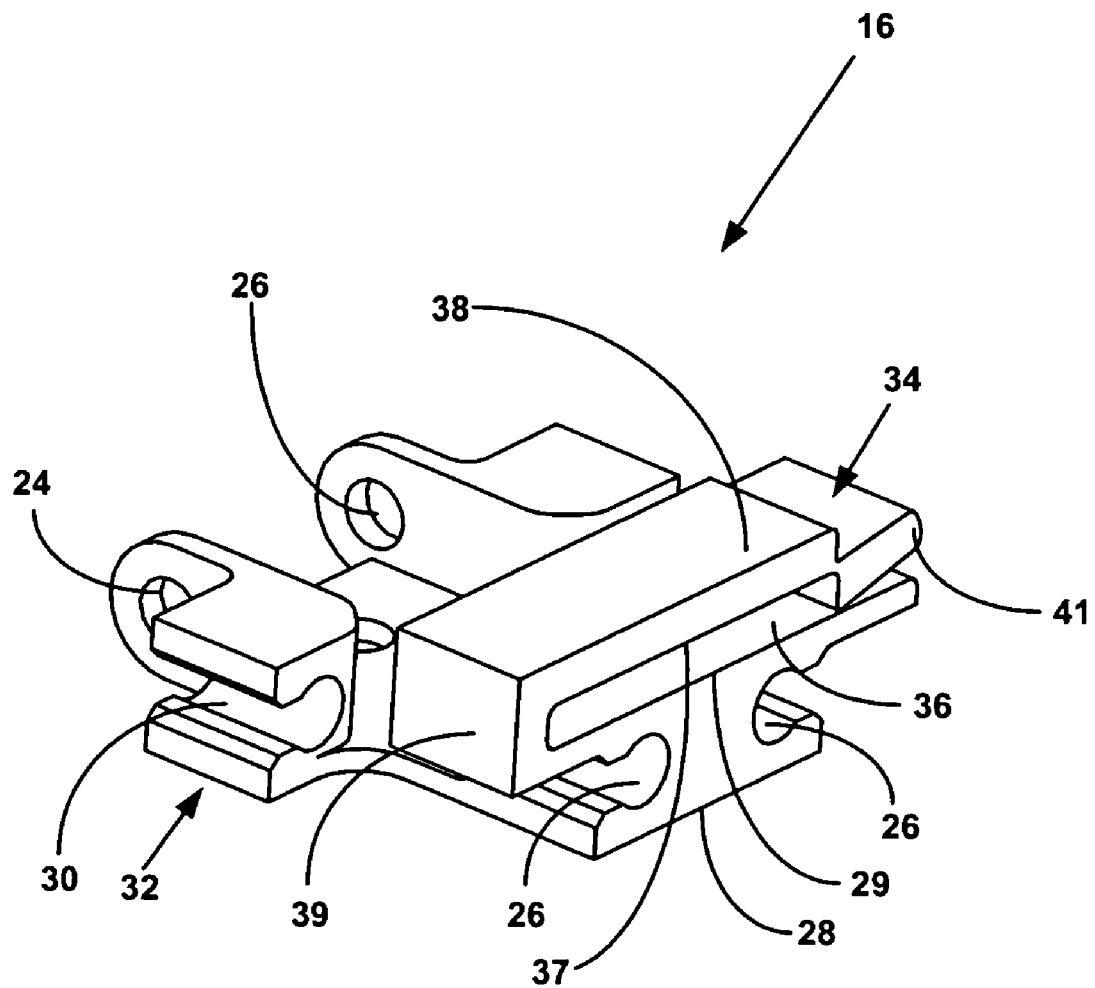
FIG. 3 is a perspective view of a first mounting bracket adapted to retain a first end of the tube-cable-router of FIG. 1.

FIG. 3 is a left front perspective view of the second end mounting bracket terminator 16 of FIG. 1 and illustrates a first pair of parallel open side tube grooves 26 formed in a second groove plane (26P) in a base member 28 and having axis 26A essentially parallel to the longitudinal direction of travel of flexible tube-cable-router 10 in order to carry a pair of liquid tubes 78 (in broken lines) therein. Similarly, a second pair of parallel open side tube grooves 30 (best seen in FIG. 3A) is also formed in the second groove plane (26P) in a shoulder member 32 and having axis 30A essentially parallel to the longitudinal direction of travel of flexible tube-cable-router 10 in order to carry another pair of liquid tubes 78 therein, shoulder member 32 flaring outwardly from base member 28 to simultaneously secure a flat ribbon electrical cable and a number of fluid tubes.

Figure 3A:
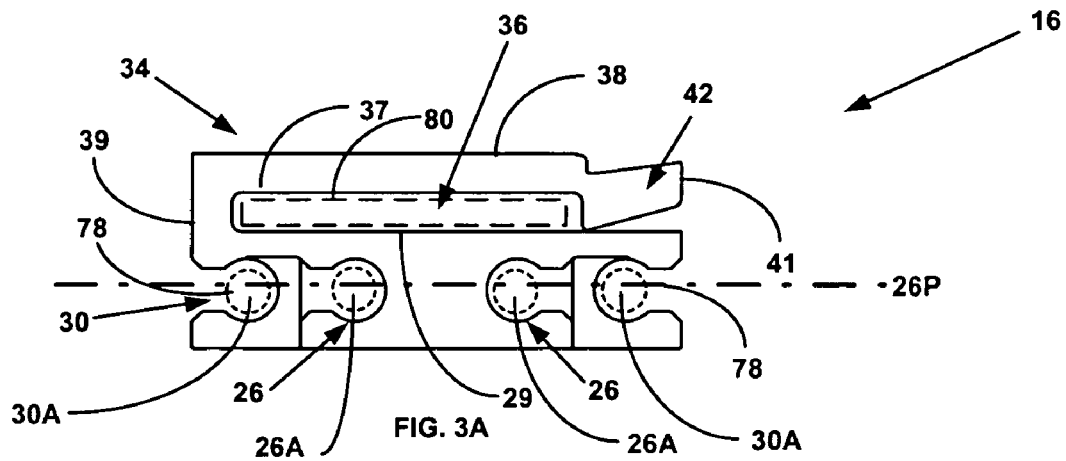
FIG. 3A is a front elevation view of the mounting bracket of FIG. 3.
Figure 3B:
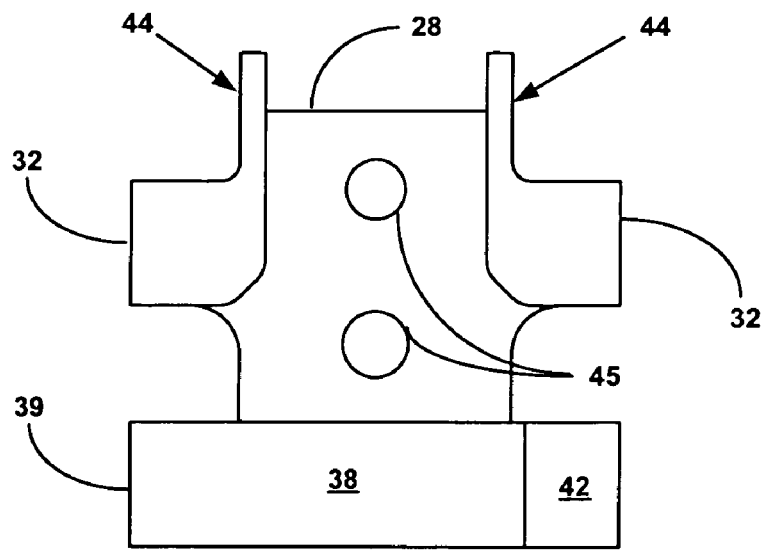
FIG. 3B is a top plan view of the mounting bracket of FIG. 3.
Figure 3C:
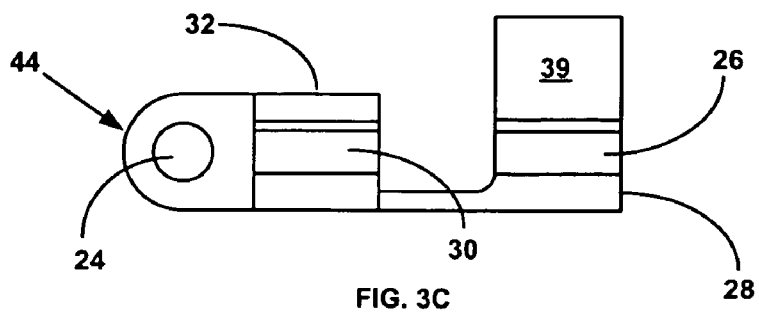
FIG. 3C is a side elevation view of the mounting bracket of FIG. 3.

A cable platform 34 is integrally superposed over base member 28 and comprises a transverse opening 36 defined by the upper surface 29 of base member 28 and the lower surface 37 of a flexible clasp 38 attached only at one end 39 to base member upper surface 29. FIG. 3A shows how the transverse opening 36 is dimensioned to accept a flat ribbon cable 80 (shown in dashed lines) between base member upper surface 29 and flexible clasp 38. For purposes of convenience in placing a flat ribbon cable within transverse opening 36, the unattached end 41 of flexible clasp 38 is formed as a obliquely angled upwards step 42. Best seen in FIG. 3C, a terminator tab member 44 extends laterally from each shoulder member 32 a distance beyond base member 28 and terminator hinge openings 24 of second end mounting bracket terminator 16 are formed therein. Upper surface 29 of base member 28 is seen in FIG. 3B as openly exposed between shoulder members 32 with a pair of mounting holes 45 formed therein and inline with the longitudinal direction of travel of flexible tube-cable-router 10 in order to allow securing flexible tube-cable-router 10 to an appropriate surface.

Figure 4:
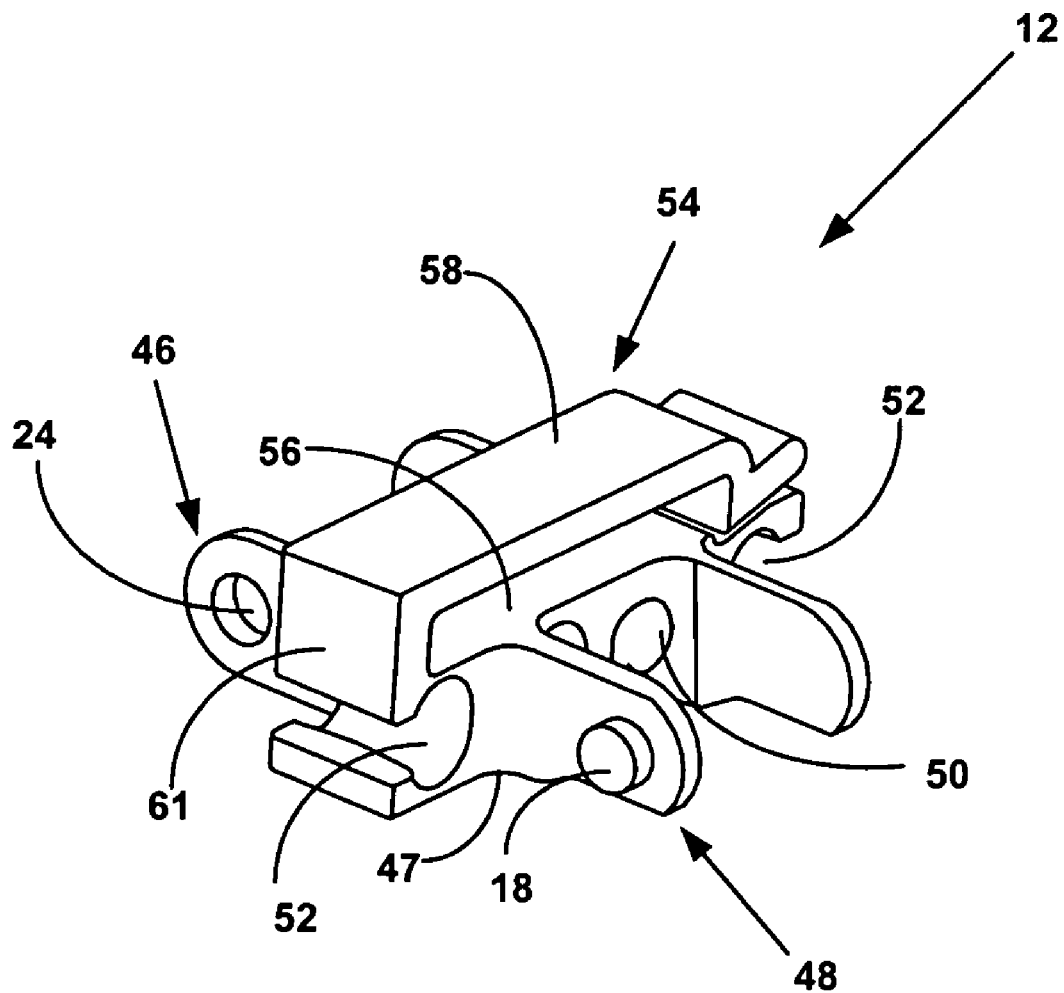
FIG. 4 is a perspective view of a link adapted to simultaneously retain a number of tubes as well as a flat electrical cable and adapted to mate with the mounting bracket of FIG. 3.
Figure 4A:
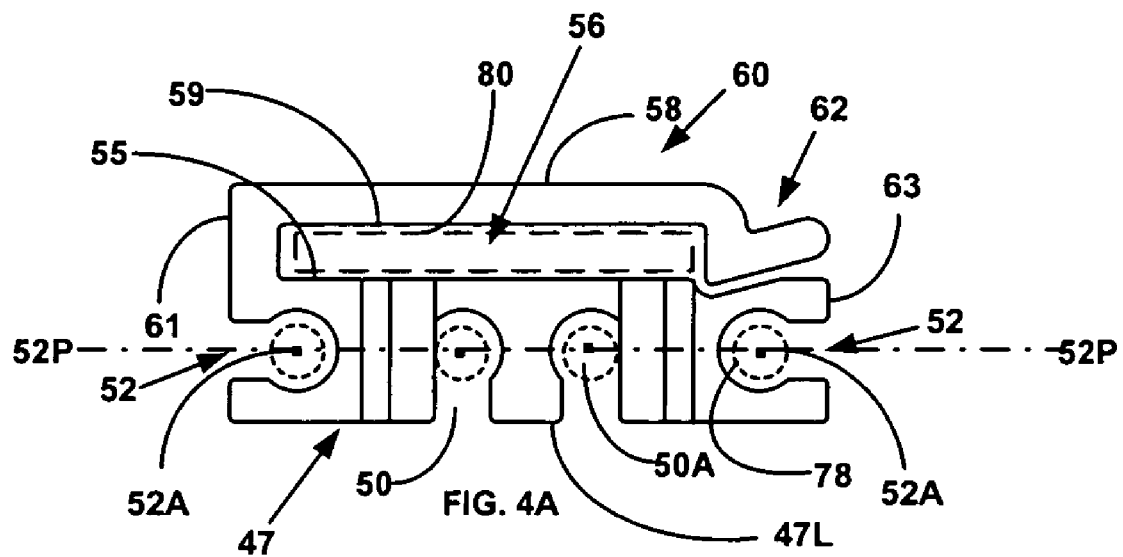
FIG. 4A is a front elevation view of the link of FIG. 3.
Figure 4B:
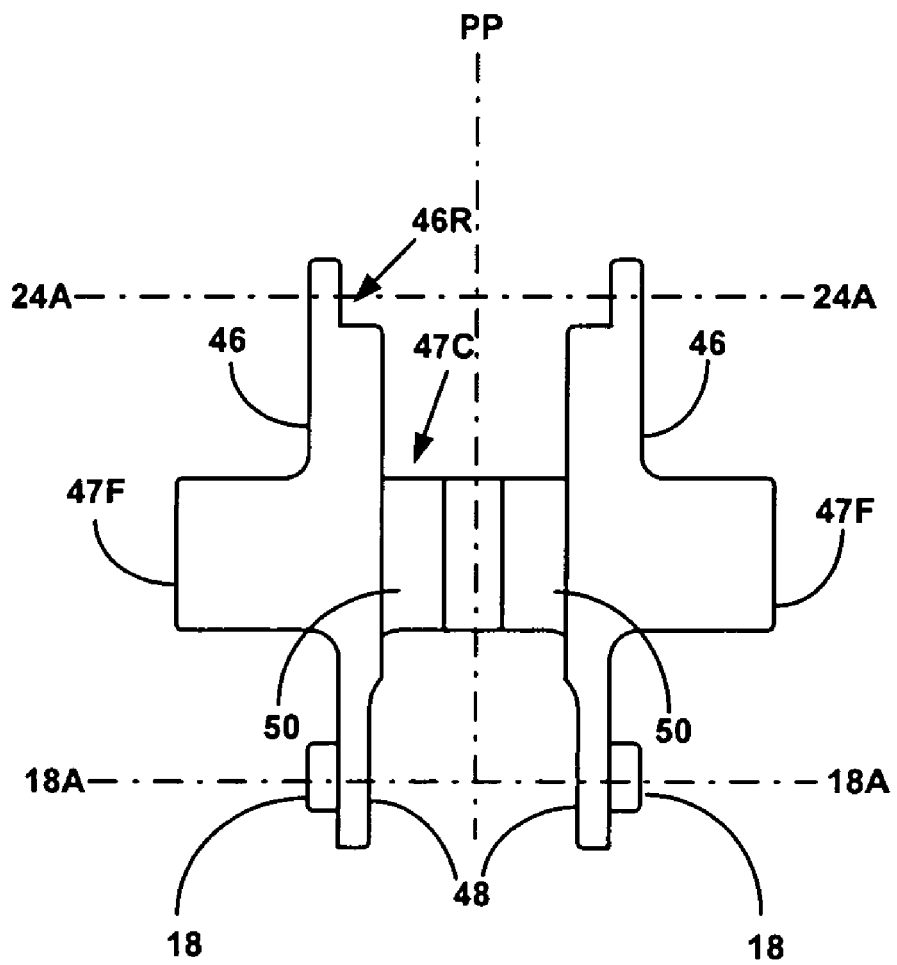
FIG. 4B is a bottom plan view of the link of FIG. 3.
Figure 4C:
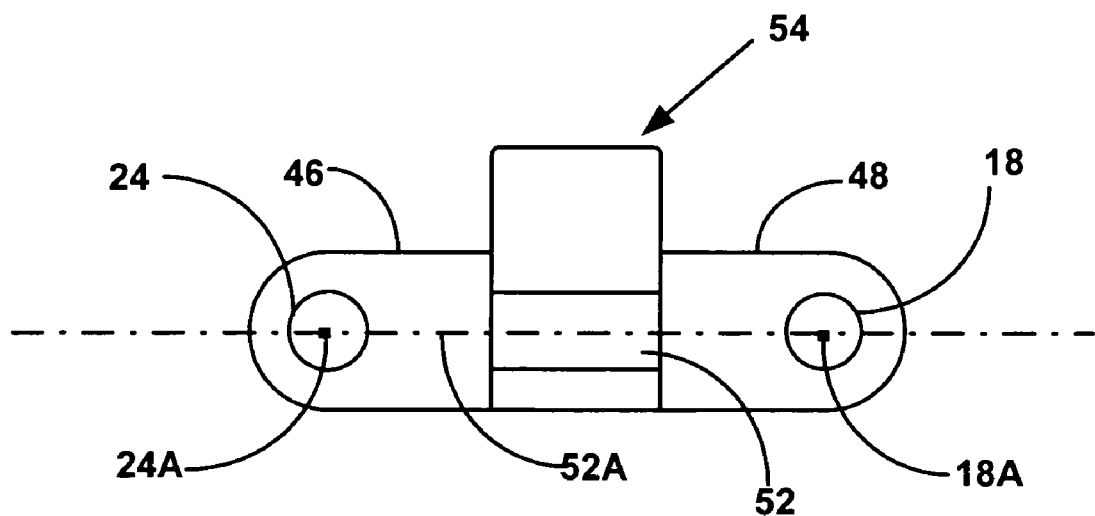
FIG. 4C is a side elevation view of the link of FIG. 3.

FIG. 4 is a left perspective view of the link member 12 of FIG. 1, each link member 12 having two parallel tab elements 46 extending in one direction from a rectangular shaped link base cross-member 47 (best seen in FIG. 4B) having two parallel tongue elements 48 extending in an opposite direction from the cross-member. As illustrated, link hinge openings 24 are formed in recessed portions 46R of tab elements 46 and transverse, cylindrical link hinge pins 18 are outwardly formed on tongue elements 48. The side elements of assembled next adjacent link members 12 have overlapping sections and are joined by engaging the cylindrical hinge pins 18 of one link member 12 into the hinge openings 24 of a next adjacent link member 12 to pivot or rotate within a pivoting plane formed perpendicular to the central axis 18A of hinge pins 18 and the central axis 24A of hinge openings 24 (FIGS. 4B and 4C). The diametrical dimensions of hinge pins 18 and hinge openings 24 are chosen to have as little clearance as possible therebetween so that an assembly of interconnected link members 12 has high lateral stability.

Link base cross-member 47 comprises a cut-away central portion 47C (best seen in FIG. 4B) with two open top parallel tube grooves 50 formed essentially parallel to the longitudinal direction of travel of flexible tube-cable-router 10 in order to carry a pair of liquid tubes therein. Similarly, base cross-member 47 comprises outwardly opposed flange portions 47F with two open side parallel tube grooves 52 formed essentially parallel to the longitudinal direction of travel of flexible tube-cable-router 10 in order to carry a pair of liquid tubes therein. FIG. 4A shows parallel tube grooves 50 and 52 as having their longitudinal axis 50A and 52A, respectively in a groove plane 52P perpendicular to the pivoting plane PP (FIG. 4B). Because the flexible tube-cable-router 10 of the present invention is formed by assembling together an articulated number of individual dual-end links 12 with high lateral stability, the longitudinal axis of tubes carried by flexible tube-cable-router 10 are constantly maintained in a plane perpendicular to the groove plane and containing the central radius of curvature of tube-cable-router 10. Because the longitudinal axis of tubes 78 carried by flexible tube-cable-router 10 are maintained in a plane containing the central radius of curvature of tube-cable-router 10, "peristaltic-type" pumping action of fluid carried within such tubes is minimized as the curved section of tubes is moved in the direction of travel of tube-cable-router 10. The elimination of peristaltic pumping, in combination with carrying flat ribbon cable 80 next described, is a key feature of the present invention.

A link cable platform 54 is integrally superposed over link base cross-member 47 and comprising a transverse opening 56 defined by the upper surface 55 of link base cross-member 47 and the lower surface 59 of a flexible clasp 60 attached only at one end 61 to link base cross-member upper surface 55. FIG. 4A shows how the transverse opening 56 is formed as a cross-sectional opening to accommodate a flat ribbon cable 80 (shown in dashed lines) between link base cross-member 47 and flexible clasp 58. For purposes of convenience in placing a flat ribbon cable 80 within transverse opening 56, the unattached end 63 of flexible clasp 58 is formed as a obliquely angled upwards step 62. Best seen in FIG. 4C, tab elements 46, having link hinge openings 24 formed in recessed portions 46R thereof, extend laterally in one direction from rectangular shaped link base cross-member 47 and tongue elements 48, having link hinge pins 18 are outwardly formed thereon, extend in an opposite direction from the cross-member. The lower surface 47L of link base cross-member 47 is seen in FIG. 4B as openly exposed between flange portions 47F with a pair of open bottom parallel tube grooves 50 formed essentially parallel to the longitudinal direction of travel of flexible tube-cable-router 10 in order to carry a pair of liquid tubes 78 therein.

Figure 5:
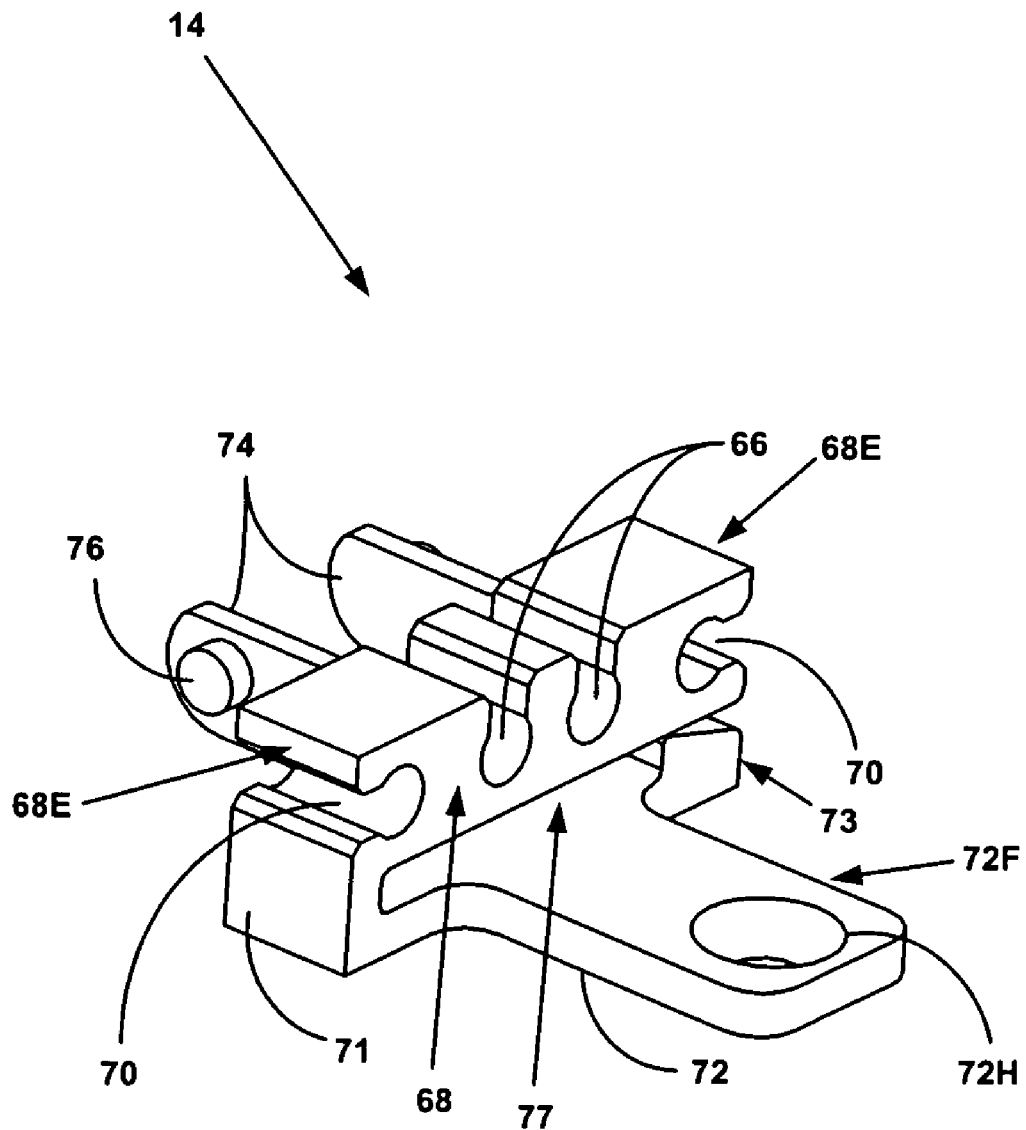
FIG. 5 is a perspective view of a second mounting bracket adapted to retain a second end of the tube-cable-router of FIG. 1.
Figure 5A:
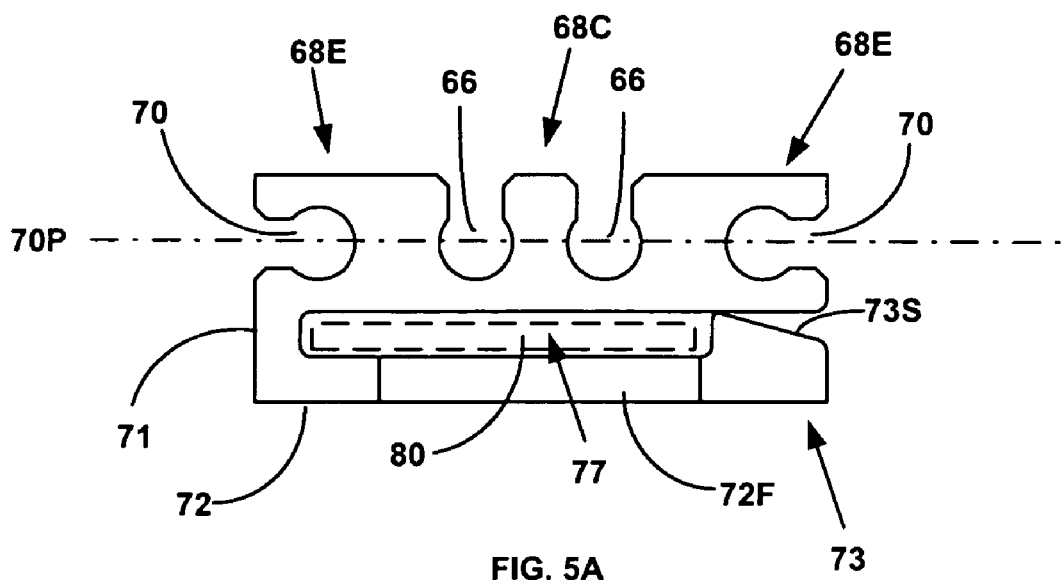
FIG. 5A is a front elevation view of the mounting bracket of FIG. 4.
Figure 5B:
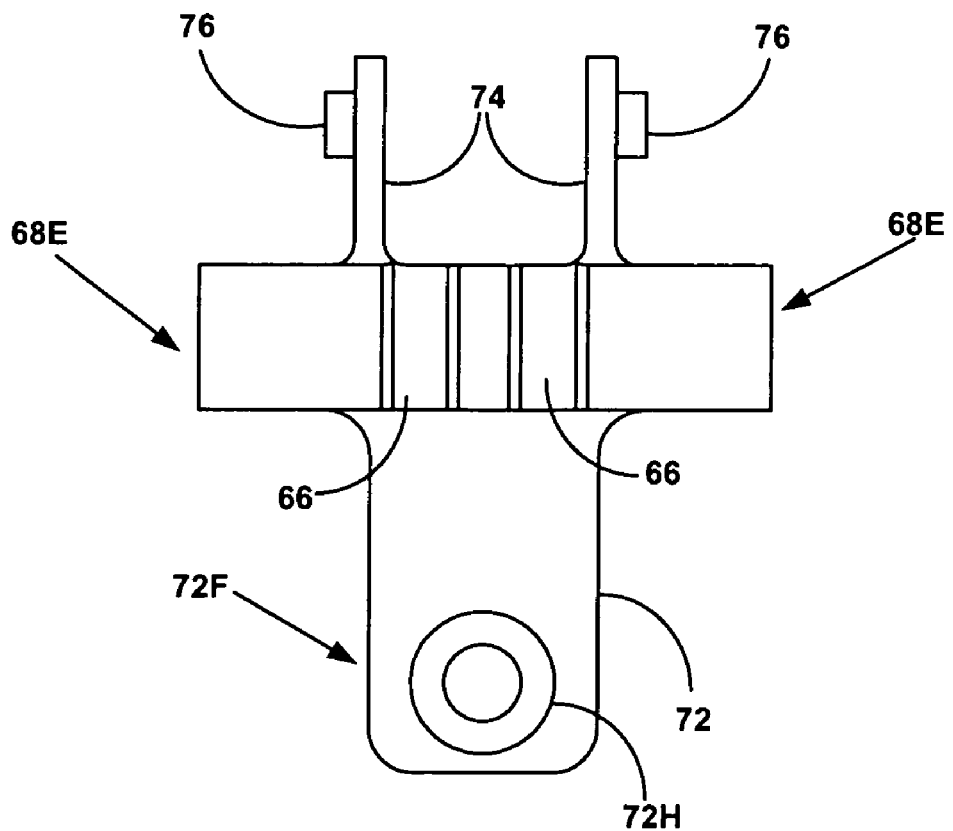
FIG. 5B is a top plan view of the mounting bracket of FIG. 4.
Figure 5C:
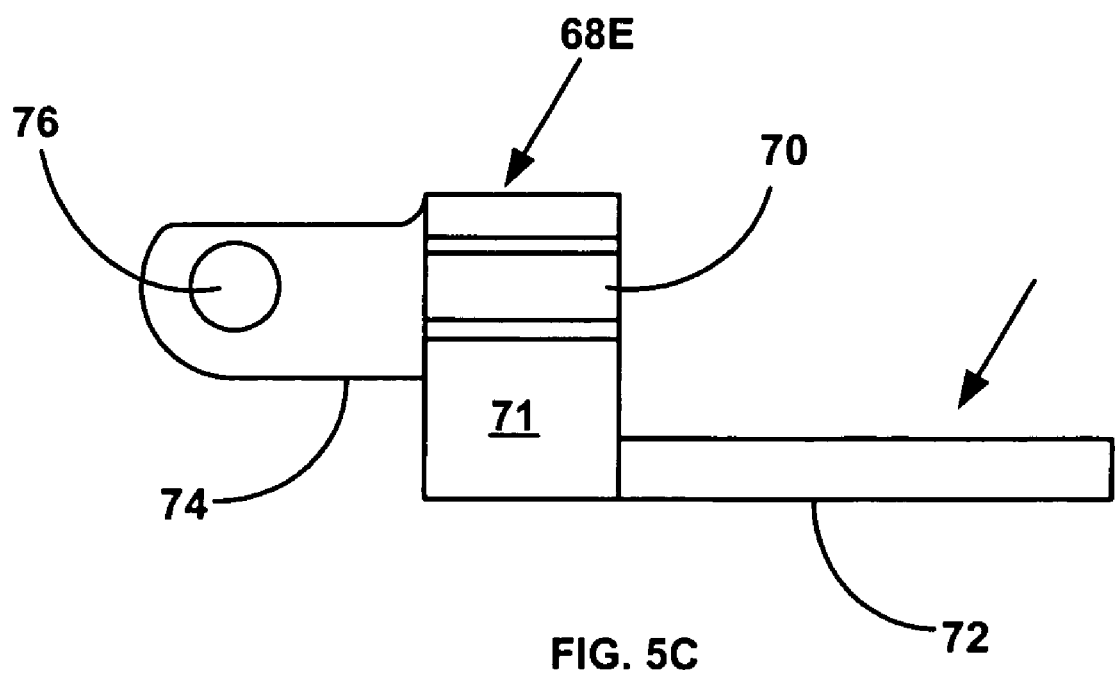
FIG. 5C is a side elevation view of the mounting bracket of FIG. 4.

FIG. 5 is a left front perspective view of the first end mounting bracket terminator 14 of FIG. 1 and illustrates a first pair of parallel open side tube grooves 66 formed in a central region 68C of a tube tower 68 and essentially parallel to the longitudinal direction of travel of flexible tube-cable-router 10 in order to carry a pair of liquid tubes therein. Similarly, a second pair of parallel open side tube grooves 70 (also seen in FIG. 5A) is formed in end regions 68E of tube tower 68 and essentially parallel to the longitudinal direction of travel of flexible tube-cable-router 10 in order to carry a pair of liquid tubes 78 therein. The tube tower 68 is flexibly hinged at only one side to a vertical side wall 71 extending upwards from a mounting bracket terminator base 72, being superposed thereover. An upwardly extending opposing sidewall 73 of mounting bracket terminator base 72 has an inclined upper surface 73S (seen in FIG. 5A) so that a transverse cross-sectional opening 77 is created between upper surface 73S and tube tower 68, enabling accommodation of a flat ribbon cable 80 (shown as dashed lines in FIG. 5A) between tube tower 68 and mounting bracket terminator base 72. As seen in FIG. 5B, first end mounting bracket terminator 14 comprises a frontward extending flare portion 72F and tab elements 74 extending in an opposite direction from the frontward extending flare portion 72F, tab elements 74 having link hinge pins 76 formed outwardly thereon. A mounting hole 72H is formed in flare portion 72F to allow securing assembled flexible tube-cable-router 10 to an appropriate surface.

Figure 6:
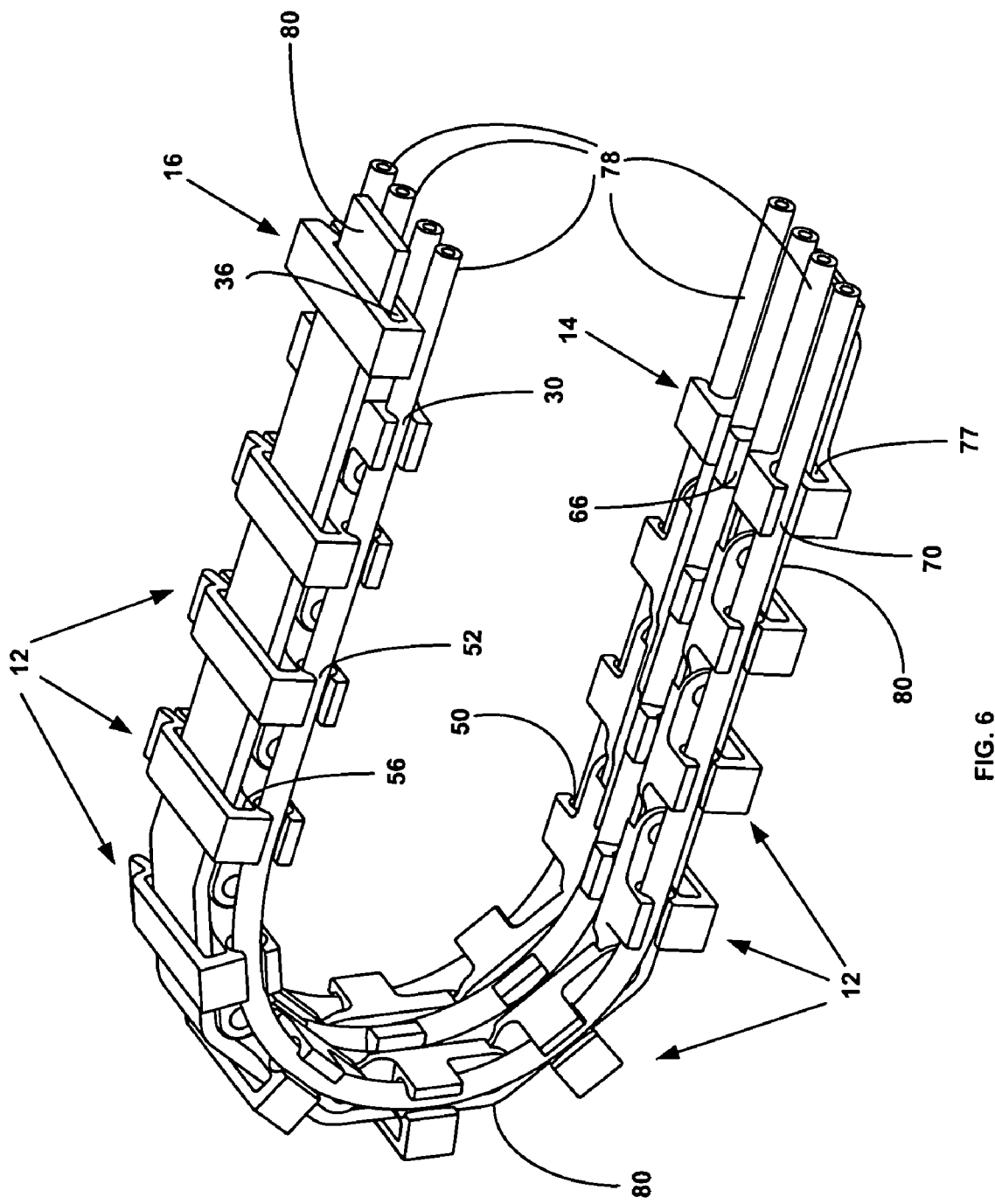
FIG. 6 is an illustration of tubes carried with their longitudinal axes maintained in a plane containing the central radius of curvature of the tube-cable-router of FIG. 1.

Cable-router 10 is illustrated in FIG. 6 as carrying one pair of liquid tubes 78 within the first pair of parallel open side tube grooves 26 formed in a base member 28 of mounting bracket terminator 16 and essentially parallel to the longitudinal direction of travel of flexible tube-cable-router 10 in addition to carrying another pair of tubes 78 within the second pair of parallel open side tube grooves 26 of mounting bracket terminator 16 of essentially parallel to the longitudinal direction of travel of flexible tube-cable-router 10. FIG. 6 also shows parallel tube grooves 50 and 52 of link member 12 as having their longitudinal axis 50A and 52A, respectively in a groove plane perpendicular to the pivoting plane so that the longitudinal axis of tubes 78 are constantly maintained in a plane perpendicular to the groove plane and containing the central radius of curvature of tube-cable-router 10. In addition, FIG. 6 illustrates bracket terminator 14 as carrying one pair of tubes 78 within the first pair of parallel open side tube grooves 66 and carrying another pair of tubes 78 within the second pair of parallel open side tube grooves 70, both essentially parallel to the longitudinal direction of travel of flexible tube-cable-router 10. As mentioned before, a key feature of the present invention is maintaining the longitudinal axis of tubes 78 in a plane containing the central radius of curvature of tube-cable-router 10 so that "peristaltic-type" pumping action of fluid carried within such tubes 78 is minimized as the curved section of tubes 78 is moved in the direction of travel of tube-cable-router 10.

Cable-router 10 is further illustrated in FIG. 6 as carrying a single flat ribbon cable 80 within the transverse opening 36 defined by the upper surface 29 of base member 28 and the lower surface 37 of the flexible clasp 38 of the second end mounting bracket terminator 16. The illustration of a single cable 80 is not intended to be limiting, as is obvious to an artesian, more than one such ribbon cable 80 may be carried within the transverse opening 36 with simple adjustments of the dimensions of upper surface 29 and lower surface 37 of clasp 38. In addition, FIG. 6 illustrates bracket terminator 14 as carrying flat ribbon cable 80 within the transverse opening 77 defined by between tube tower 68 and mounting bracket terminator base 72 of bracket terminator 14. Finally, FIG. 6 illustrates cable-router 10 as carrying flat ribbon cable 80 within transverse opening 56 defined by the upper surface 55 of link base cross-member 47 and the lower surface 59 of clasp 60 attached only at one end 61 to link base cross-member upper surface 55 of link member 12.

Cable-router 10 may be molded from any of a number of thermoplastic resin materials, including polyolefins, low density polyethylene, high impact polystyrene and polycarbonate. Clamp 10 can also be comprised of a combination of such resins. Preferably however, because of the necessity for precise dimensioning, an engineering plastic like acrylonitrile butadiene styrene, ABS, a copolymer of acrylonitrile, butadiene, and styrene may be advantageously employed. ABS plastics generally possess medium strength and performance and medium cost and are often used as the cost and performance dividing line between standard plastics (PVC, polyethylene, polystyrene, etc.) and engineering plastics (acrylic, nylon, acetal, etc.).

It should be readily appreciated by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, the dimensions of transverse opening 36 can be adjusted to accommodate more than one ribbon cable 80. Accordingly, while the present invention has been described herein in detail in relation to specific embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A flexible energy tube-cable-router having first and second ends, said router comprising:

a first end mounting bracket terminator (14) and a second end mounting bracket terminator (16);

parallel open side tube grooves (70) and parallel open top tube grooves (66) formed in a first groove plane (70P) in the first end mounting bracket terminator;

a first pair of parallel open side tube grooves (26) and a second pair of parallel open side tube grooves (30) formed in a second groove plane (26P) in the second end mounting bracket terminator;

an articulated plurality of link members (12) flexibly linked to one another in a pivoting plane (PP) and linked to said first end mounting bracket terminator in a manner such that said first groove plane (70P) and said second groove plane (26P) are perpendicular to the pivoting plane (PP); and, parallel open side and open top tube grooves (50 and 52) formed in the link hinge pins, wherein the longitudinal axis (50A and 52A) of tubes disposed in the parallel tube groves (50 and 52) are in a plane (52P) perpendicular to the pivoting plane (PP).

2. The router of claim 1 wherein:

the first end mounting bracket terminator comprises a tube tower having the parallel open top and side tube grooves formed therein, the tower flexibly attached only at one end to a first base portion of the first end mounting bracket terminator and defining a first transverse opening between the tower and the first base portion;

the second end mounting bracket terminator comprises a cable platform having a second transverse opening between a second base portion of the first end mounting bracket terminator and a flexible clasp attached only at one end to the second base portion; and, the link members comprise a base cross-member having the open side and top tubes grooves formed therein with a third transverse opening defined thereover by a flexible clasp flexibly attached only at one end to the base cross-member, wherein the first, second and third transverse openings are similarly sized to accommodate at least one flat ribbon cable therein.

3. The router of claim 2 wherein:

the link members comprise tab elements having link hinge openings formed in recessed portions thereof and extend laterally in one direction from the base cross-member and tongue elements having link hinge pins outwardly formed thereon and extend in an opposite direction from the cross-member;

the first end mounting bracket terminator further comprises a frontward extending flare portion and tab elements extending in an opposite direction from the flare portion, the tab elements having link hinge pins formed outwardly thereon; and, the second end mounting bracket terminator further comprises a terminator tab member extending beyond base member and terminator hinge openings are formed therein.

4. The router of claim 3 wherein the link hinge pins of the first end mounting bracket terminator are placed within the link hinge openings of the link members and wherein the link hinge pins of the link members are placed within the terminator hinge openings of the second end mounting bracket terminator.

5. The router of claim 1 wherein the articulated plurality of link members are flexibly linked to one another by placing the link hinge pins of one link hinge member into the link hinge openings of a next adjacent link hinge member.

* * * * *